(12) United States Patent
Hinch

(10) Patent No.: US 6,374,388 B1
(45) Date of Patent: Apr. 16, 2002

(54) EQUIVALENT TIME CAPTURE SCHEME FOR BIT PATTERNS WITHIN HIGH DATA RATE SIGNALS

(75) Inventor: Stephen W. Hinch, Santa Rosa, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/393,148

(22) Filed: Sep. 10, 1999

(51) Int. Cl.[7] .............................................. G06F 11/00
(52) U.S. Cl. ...................................... 714/799; 714/819
(58) Field of Search ................................ 714/799, 819, 714/758

(56) References Cited

U.S. PATENT DOCUMENTS

| | | | | |
|---|---|---|---|---|
| 5,384,828 A | * | 1/1995 | Brown et al. ............... | 379/59 |
| 5,694,425 A | * | 12/1997 | Suganuma et al. .......... | 375/240 |
| 6,286,124 B1 | * | 9/2001 | Hooper et al. .............. | 714/799 |

* cited by examiner

*Primary Examiner*—Phung M. Chung
(74) *Attorney, Agent, or Firm*—John L. Imperato

(57) ABSTRACT

A capture scheme detects repetitive occurrences of finite-length bit patterns within an applied data signal to provide trigger events for equivalent time sampling of the data signal. The capture scheme enables acquisition of samples within designated bit patterns of the data signal, independent of whether the data signal is random in nature, since the designated finite-length bit patterns occur repetitively within the data signal. In an apparatus implementation of the capture scheme, a bit pattern detector detects a designated bit pattern within the applied data signal and generates trigger events responsive to the occurrences of the bit pattern. An equivalent time sampler receives the data signal and trigger events to acquire samples of the data signal within the designated bit pattern. The capture scheme is alternatively implemented as a method including the steps of detecting a designated bit pattern, generating trigger events responsive to the occurrences of the bit pattern and acquiring equivalent time samples of the data signal according to the trigger events.

20 Claims, 4 Drawing Sheets

EQUIVALENT TIME CAPTURE SCHEME FOR BIT PATTERNS WITHIN HIGH DATA RATE SIGNALS

BACKGROUND OF THE INVENTION

When monitoring data signals within a communication system, it is desirable to identify those bit patterns in the signals that cause errors or otherwise corrupt the performance of the communication system. Equivalent time sampling oscilloscopes enable data signals to be sampled and displayed when the data rates of signals are too high for real time sampling of the signals, but the resulting displayed signals include a series of disconnected dots, from which, it is difficult to identify a particular bit pattern. Particular bit patterns can be identified when a pulse pattern generator provides a test data signal to an equivalent time oscilloscope. The provided test data signal has a cyclical data pattern and a trigger signal at the cycle frequency of the data pattern that enable the equivalent time oscilloscope to acquire samples of a designated bit pattern within the signal based on the timing location of the bit pattern relative to the trigger signal. However, the cyclical characteristics and trigger signal of the test data signal provided by the pulse pattern generator are generally not present in live data signals within a communication system, making equivalent time samplers not feasible for viewing designated bit patterns in the live data signal. Accordingly, there is a need for an equivalent time sampling scheme that enables designated bit patterns within a live data signal to be captured.

SUMMARY OF THE INVENTION

A capture scheme constructed according to the preferred embodiment of the present invention detects repetitive occurrences of finite-length bit patterns within an applied data signal to provide trigger events for equivalent time sampling of the data signal. The capture scheme acquires samples within designated bit patterns of the data signal, independent of whether the data signal is random in nature, since the designated bit patterns occur repetitively within the data signal. In an apparatus implementation of the capture scheme, a pattern detector detects a designated finite-length bit pattern within the applied data signal and generates trigger events responsive to the occurrences of the bit pattern. An equivalent time sampler receives the data signal and trigger events to acquire samples of the data signal within the designated bit pattern. A programmable input enables particular bit patterns to be designated according to predefined criteria, depending on the characteristics of the data signal that are sought.

The capture scheme is alternatively implemented as a method including the steps of detecting a designated bit pattern, generating trigger events responsive to the occurrences of the bit pattern and acquiring equivalent time samples of the data signal according to the trigger events.

DETAILED DESCRIPTION OF THE PREFERRED EMBODIMENT

Figure 1:
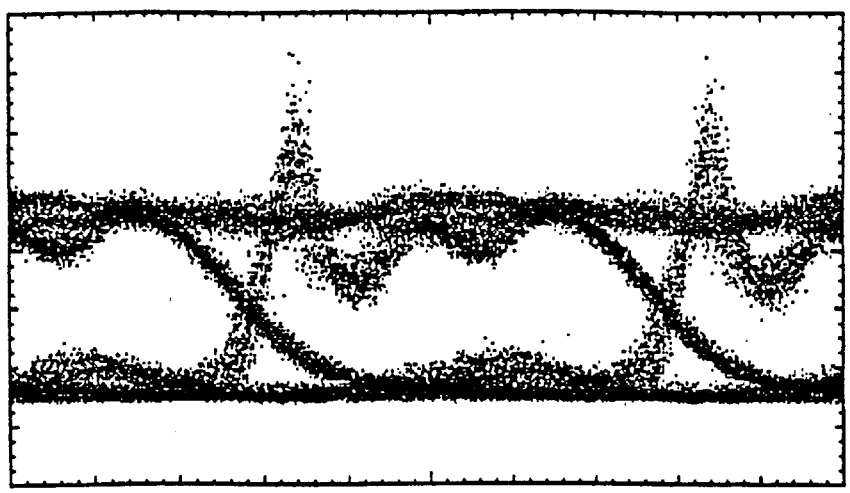
FIG. 1 (prior art) shows a displayed data signal from prior art equivalent time sampling oscilloscope.

FIG. 1 shows a displayed data signal from a prior art equivalent time sampling oscilloscope. Equivalent time sampling oscilloscopes enable a data signal to be captured and displayed when the data rate of a data signal exceeds the rate at which real time sampling of the data signal can be achieved. The displayed signal from the equivalent time sampling oscilloscope is typically in the form of an eye diagram, as shown, that indicates the waveform shapes of all combinations of the logic states within the data signal applied to the oscilloscope. The data signal is applied to a signal input of the equivalent time oscilloscope and the oscilloscope is triggered by a clock signal at the data rate of the data signal. The triggering initiates sampling of the data signal and each sample is displayed as a single point on the screen. After numerous triggers, the oscilloscope displays a sampled representation of the data signal. A limitation of the data signal as displayed by the equivalent time sampling oscilloscope is that it consists of a series of disconnected dots, making it difficult to identify particular bit patterns, such as those causing data errors.

Figure 2:
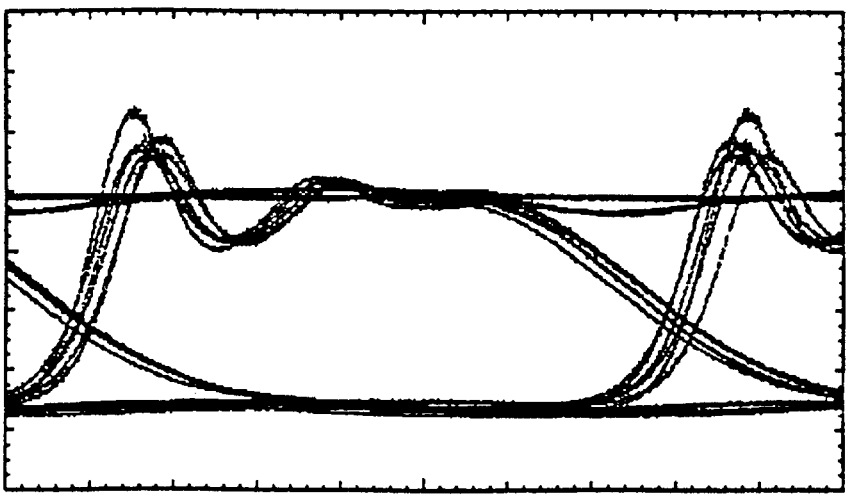
FIG. 2 (prior art) shows a displayed test signal produced by a prior art configuration of a pulse pattern generator and an equivalent time sampling oscilloscope.

FIG. 2 shows a displayed test signal produced by a prior art configuration of a pulse pattern generator and an equivalent time sampling oscilloscope. The pattern generator provides a test data signal to the equivalent time sampling oscilloscope, enabling particular bit patterns within the test data signal to be identified. The test data signal supplied by the pattern generator has a cyclical data sequence and a trigger at the cycle frequency of the data sequence that enable the equivalent time sampling oscilloscope to sample and display samples of a particular bit pattern within the sequence based on the timing location of the bit pattern relative to the trigger. Unfortunately, the cyclical characteristics of the test data signal and the accompanying trigger as provided by the pattern generator and relied upon by the equivalent time sampling oscilloscope to sample and display the designated bit pattern are generally not present in a live data signal that is random, psuedorandom or noncyclical in nature.

Figure 3:
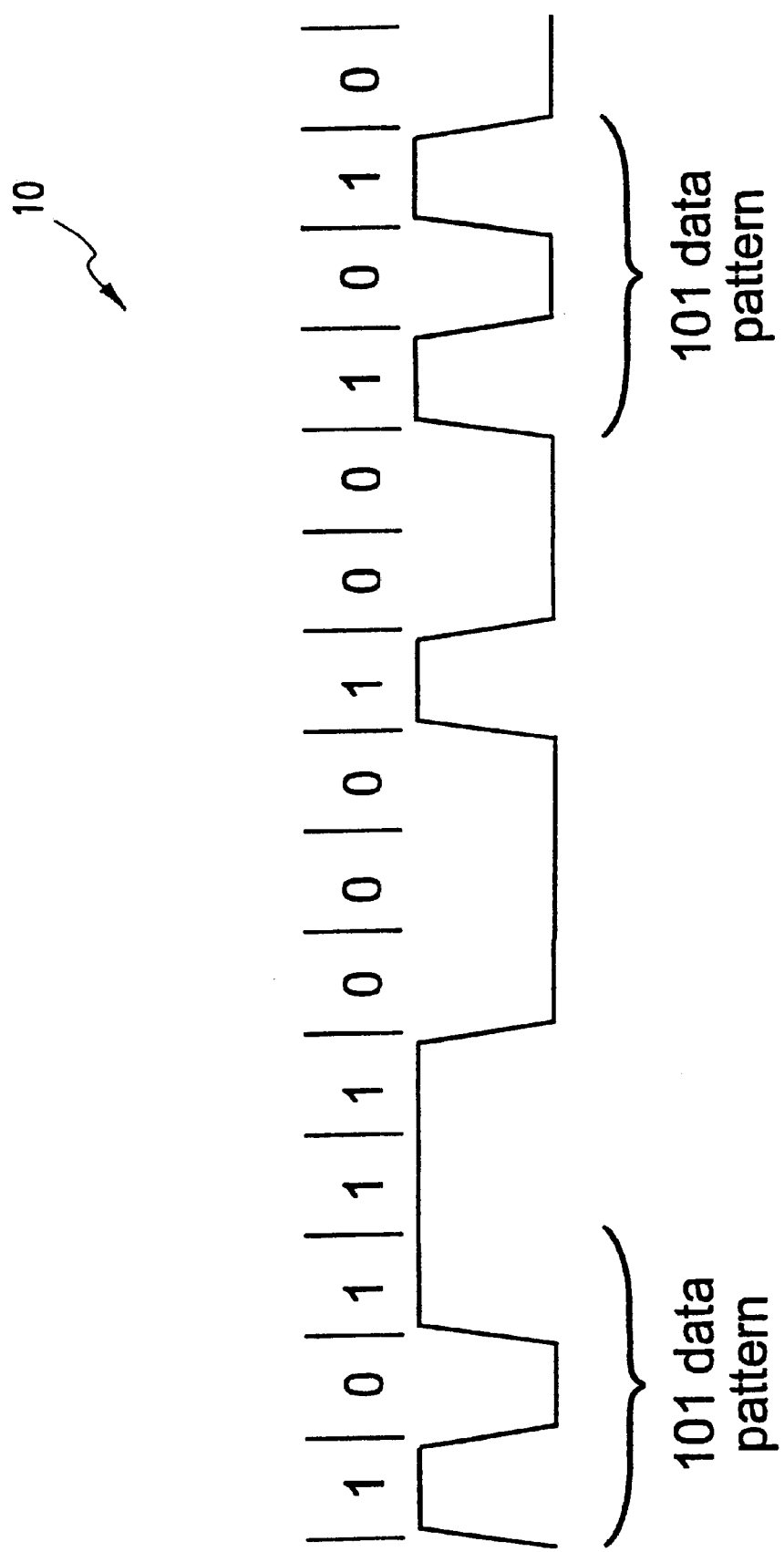
FIG. 3 shows a portion of a random data signal as applied in the capture scheme constructed according to the preferred embodiment of the present invention.

FIG. 3 shows a portion of a data signal 10 as applied in the capture scheme constructed according to the preferred embodiment of the present invention. Whether the data signal is repetitive, random, psuedorandom, or cyclical, it will generally include finite-length bit patterns that recur within the data signal 10. For example, the portion of the random data signal 10 shown contains multiple occurrences of the finite-length 101 bit pattern. The 101 bit pattern is one of eight three-bit patterns that may be present within the data signal 10. Since a particular bit pattern within the data signal may cause errors in the data signal, corrupt the performance of a communication system in which the data signal is present or otherwise be of interest, capturing a designated bit pattern within the data signal is desirable when monitoring communication systems.

Figure 4:
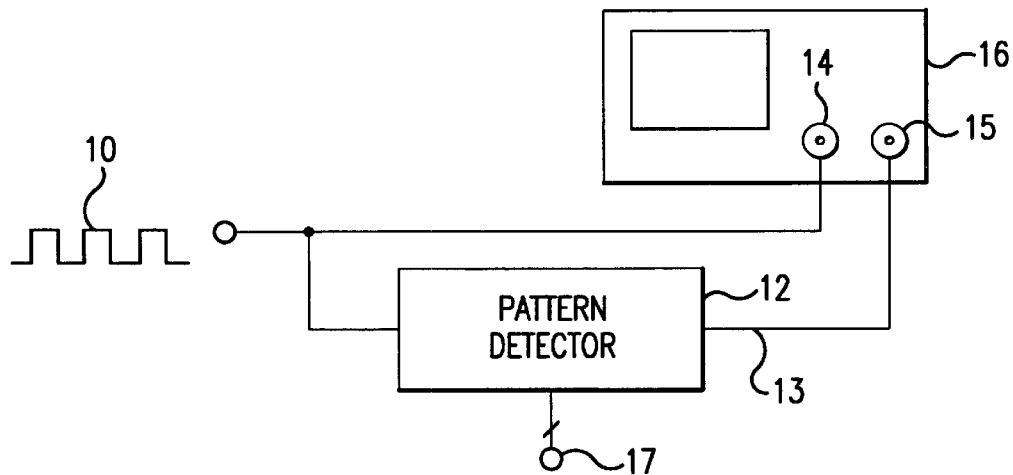
FIG. 4 shows an apparatus for implementing the capture scheme according to the preferred embodiment of the present invention.

FIG. 4 shows an apparatus constructed according to the preferred embodiment of the present invention for capturing a designated bit pattern within a data signal 10. A data signal 10 is applied to a pattern detector 12 and a signal input 14 of an equivalent time sampler 16. An output 13 of the pattern detector 12 is applied to a trigger input 15 of the equivalent time sampler 16. The pattern detector 12 tracks the logic states of the bits within the applied data signal 10 and generates trigger events at its output 13 upon the occurrences of the designated bit pattern. The equivalent time sampler 16 acquires samples of the applied data signal 10 in response to the trigger events by sequential sampling or random repetitive sampling to capture the segment of the waveform of the data signal 10 corresponding to the designated bit pattern. The known techniques of sequential sampling and random repetitive sampling are described in *Fiber Optic Test and Measurement*, Chapter 8, Published by Prentice Hall PTR, ISBN 0-13-534330. When sequential sampling is used, a delay line (not shown) is included to delay the data signal 10 at the signal input 14 of the equivalent time sampler 16 to assure that the designated bit pattern is not present at the signal input before the trigger events become available at the trigger input 15. In this example, the equivalent time sampler 16 is implemented using an equivalent time sampling oscilloscope, enabling the samples of the waveform of the captured bit pattern to be displayed.

The designated bit pattern as captured by the equivalent time sampler 16 may be fixed within the pattern detector 12, or alternatively, it is entered into the pattern detector 12 through a programmable input 17. In some communication systems, information is encoded in data signals in a manner that prevents occurrence of certain bit patterns. For example, runs of logic state 0's or logic state 1's that exceed a predefined length may be invalid bit patterns and are not encoded in the data signal 10. Were the programmable input 17 to designate an invalid bit pattern, trigger events would generally not be generated at the output 13 of the pattern detector 12. To prevent the equivalent time sampler 16 from waiting indefinitely to capture an invalid bit pattern, invalid bit patterns can be blocked from the programmable input 17 by a system controller (not shown) upon designation of the invalid bit pattern.

Alternatively, the equivalent time sampler 16 automatically detects when an invalid bit pattern has been designated. The system controller coupled to the pattern detector 12 and equivalent time sampler 16 can measure the time interval between occurrences of the designated bit pattern by counting the number of data bits that pass between successive trigger events, since each trigger event is responsive to an occurrence of the bit pattern designated at the programmable input 17. An invalid bit pattern is identified based on various predefined criteria. One criterion is met when the equivalent time sampler 16 does not receive trigger events within a preset time interval. An alternative criterion is met when the equivalent time sampler 16 receives trigger events that occur substantially less frequently then other bit patterns of equal length designated at the programmable input 17.

Figure 5:
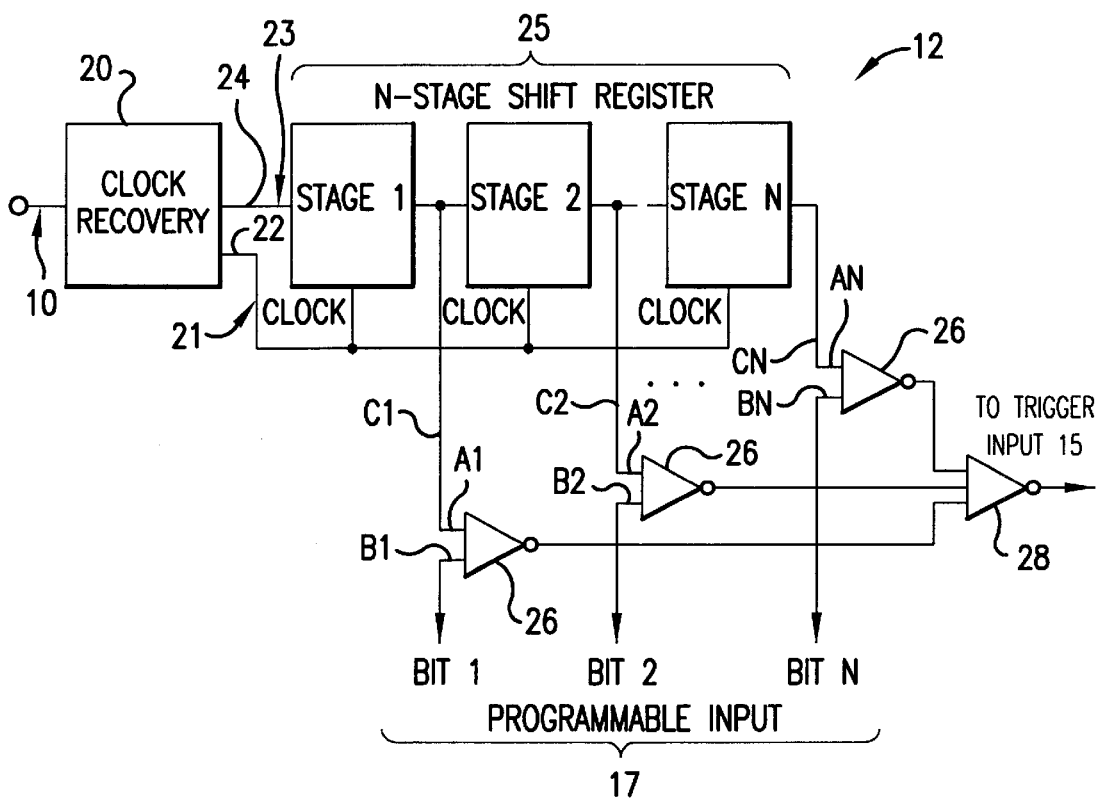
FIG. 5 shows a detailed view of a pattern detector within the apparatus of FIG. 4.

FIG. 5 shows a detailed view of the pattern detector 12. The data signal 10 is applied to a clock recovery circuit 20 that extracts a clock signal 21 from the data signal 10 and re-times the data signal 10. The clock signal 21 is present at output 22. The re-timed data signal 23 is synchronous with the data signal 10 and is present at output 24. The re-timed data signal 23 is applied to an N-stage shift register 25 that is clocked by clock signal 21. In this example, the number of stages N of the shift register 25 corresponds to the number of bits in the designated bit pattern. The output C1–CN of each stage of shift register 25 is coupled to inputs A1–AN of corresponding comparators 26. The other inputs B1–BN of the comparators 26 receive the programmable input 17. The outputs of the comparators 26 are coupled to a NAND logic gate 28 having N inputs. The logic gate 28 changes output state under the condition that the logic state of the bit at each stage of the shift register 25 matches the bit pattern as designated at the programmable input 17. This state change provides a trigger event for the trigger input 15 of the equivalent time sampler 16. For example, when the bit pattern designated at the programmable input 17 is 101, the logic states applied to inputs B1–B3 to comparators 26 are 1, 0 and 1, respectively. Under condition that the bits 1, 0 and 1 occur at the output of corresponding stages of the shift register 25, the logic gate 28 will change output state and provide a trigger event.

In an alternative implementation of the pattern detector 12, logic states of the bits within the data signal 10 are extracted based on asynchronous sampling of the data signal 10 within the pattern detector 12. One or more samples of each bit within the data signal 10 is sufficient to identify the bit pattern as designated at the programmable input 17 to the pattern detector. Upon the condition that the bit pattern identified by the asynchronous sampling matches the designated bit pattern, a trigger event is generated at the output 13 of the pattern detector 12.

Figure 6:
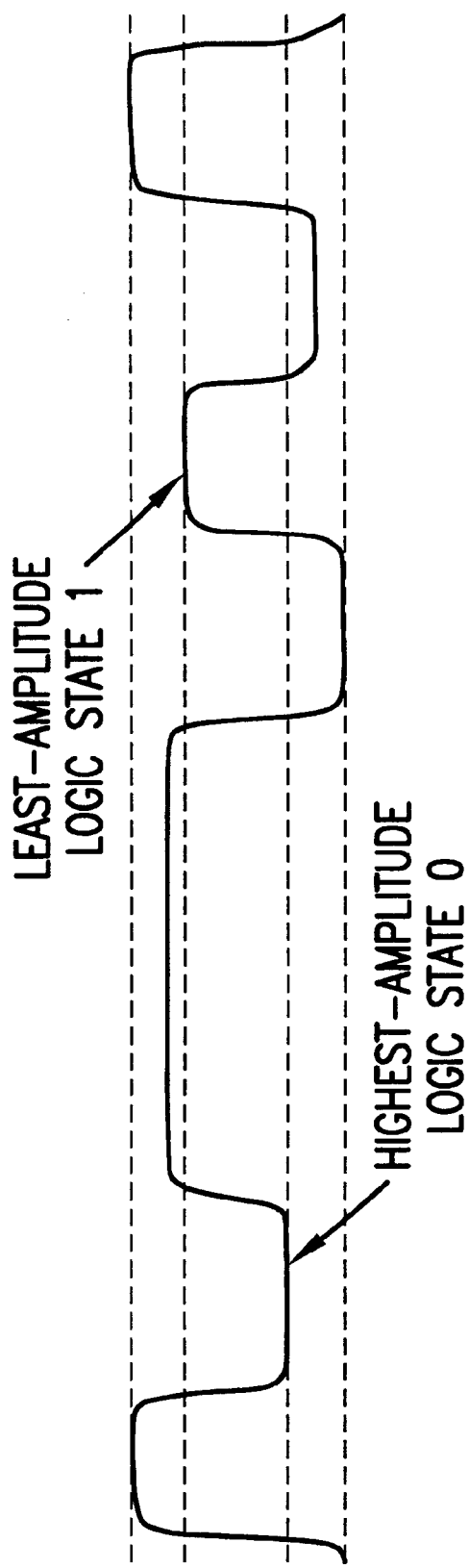
FIG. 6 shows a bit pattern of a data signal designated according to relative amplitudes of logic states within the data signal, in accordance with the preferred embodiment of the present invention.

FIG. 6 shows a bit pattern of a data signal, designated according to relative amplitudes of logic states within the data signal in accordance with the preferred embodiment of the present invention. The relative amplitudes of the logic states within the data signal and the statistical variations of the amplitudes about the logic states provides a measure of Quality factor, or Q-factor, of the data signal and enable the bit error rate of a communication system to be estimated. The Q-factor is defined as the magnitude of the difference between the mean amplitude of the 1 logic state and the mean amplitude of the 0 logic state, divided by the sum of the standard deviation of the amplitude of the 1 logic state and the standard deviation of the amplitude of the 0 logic state.

A bit pattern in which the worst-case, or lowest value, Q-factor occurs provides a valuable measure of the performance limitation of a communication system in which a data signal 10 is present. The bit pattern having the lowest Q-factor is identified using the apparatus of FIG. 4 by progressively varying the bit sequences applied to the programmable input 17. A first bit pattern is designated via programmable input 17 so that trigger events are provided by the pattern detector 12 at the occurrences of the first designated bit pattern. The equivalent time sampler 16 acquires samples of the first designated bit pattern and the amplitudes of the logic state 1 and the logic state 0 within the first designated bit pattern are recorded. Then, a second bit pattern is designated via programmable input so that trigger events are provided at the occurrences of the second designated bit pattern. The equivalent time sampler 16 acquires samples of the second designated bit pattern and the amplitudes of the logic state 1 and the logic state 0 within the second designated bit pattern are recorded. The designated bit patterns are progressively varied via the programmable input 17 until samples of each possible bit pattern have been acquired and the amplitudes of the logic states within those bit patterns have been recorded. From the recorded amplitudes of the logic states, the bit pattern having the lowest amplitude logic state 1 is identified and the bit pattern having the highest amplitude logic state 0 is identified. The programmable input 17 is then used to designate the bit pattern having the lowest amplitude logic satate 1 and to acquire samples of that bit pattern within the data signal 10. Statistical variation, such as the standard deviation, of the amplitude of the logic satate 1 within that bit pattern is computed from the acquired samples. The programmable input 17 is then used to designate the bit pattern having the highest amplitude logic satate 0 and acquire samples of that bit pattern within the data signal 10. Statistical variation, such as the standard deviation, of the amplitude of the 0 logic state within that bit pattern is computed from the acquired samples. The worst case Q-factor is then computed from the amplitudes of the logic states and amplitude variations of the corresponding logic states according the previously presented definition.

The equivalent time capture scheme constructed in accordance with the preferred embodiment of the present invention captures designated bit patterns whether the data signal 10 is optical or electrical. For optical data signals 10, a coupler, power splitter or other optical element provides the optical data signal 10 to the pattern detector 12. A photodiode placed at the input to the pattern detector 12 converts the optical data signal 10 into an electrical signal enabling clock recovery and bit pattern detection within the pattern detector 12.

While the preferred embodiment of the present invention has been illustrated in detail, it should be apparent that modifications and adaptations to this embodiment may occur to one skilled is the art without departing from the scope of the present invention as set forth in the following claims.

What is claimed is:

1. A scheme for capturing a predetermined bit pattern within a data signal, comprising:
   a bit pattern detector having an input receiving the data signal and generating trigger events at an output upon occurrences of the predetermined bit pattern; and
   an equivalent time sampler having a trigger input coupled to the output of the bit pattern detector and a signal input receiving the data signal, the equivalent time sampler acquiring samples of the data signal in response to the trigger events.

2. The scheme of claim 1 wherein the data signal has a data rate exceeding a sampling rate of the equivalent time sampler.

3. The scheme of claim 2 wherein the equivalent time sampler acquires samples of the data signal by sequential sampling.

4. The scheme of claim 2 wherein the equivalent time sampler acquires samples of the data signal by random repetitive sampling.

5. The scheme of claim 2 wherein the bit pattern detector includes a programmable input for designating the predetermined bit pattern.

6. The scheme of claim 5 wherein the bit pattern detector includes a shift register receiving the data signal and being clocked according to the data rate of the data signal, each bit of the shift register coupled to a corresponding comparator, each comparator coupled to the programmable input, an output of each comparator coupled to a logic gate changing state under the condition that contents of the shift register coincide with the programmable input.

7. The scheme of claim 6 wherein the input of the bit pattern detector includes a clock recovery circuit coupled to the shift register, receiving the data signal and recovering a clock signal from the data signal and applying the clock signal to the shift register.

8. The scheme of claim 5 further comprising a controller coupled to the programmable input precluding designation of invalid bit patterns based on predefined criteria.

9. The scheme of claim 5 wherein the predetermined bit pattern is designated according to the relative amplitudes of logic states within the data signal.

10. The scheme of claim 5 wherein the predetermined bit pattern is designated according to the ratio of the difference in amplitude between a first logic state of the data signal and a second logic state of the data signal and the sum of the amplitude variances about the first logic state and the second logic state.

11. A scheme for capturing a predetermined bit pattern within a data signal, comprising the steps of:
    receiving the data signal;
    detecting the predetermined bit pattern;
    generating trigger events in response to the detection of the predetermined bit pattern; and
    equivalent time sampling the predetermined bit pattern within the data signal in response to the trigger events.

12. The scheme of claim 11 wherein the data signal has a data rate exceeding the rate of the equivalent time sampling.

13. The scheme of claim 12 wherein the step of equivalent time sampling includes sequentially sampling the predetermined bit pattern within the data signal.

14. The scheme of claim 12 wherein the step of equivalent time sampling includes randomly repetitively sampling the predetermined bit pattern within the data signal.

15. The scheme of claim 12 further comprising the step of programmably selecting the predetermined bit pattern.

16. The scheme of claim 15 wherein the step of detecting the predetermined bit pattern includes comparing the data signal to the programmably selected predetermined bit pattern and generating the trigger event under the condition that the programmably selected predetermined bit pattern matches a segment of the data signal including the predetermined bit pattern.

17. The scheme of claim 15 wherein the step of programmably selecting the predetermined bit pattern includes designating invalid bit patterns based on predefined criteria.

18. The scheme of claim 17 wherein the predefined criteria include at least one of the nonoccurrence of trigger events and the time interval between trigger events exceeding a predefined time interval.

19. The scheme of claim 12 wherein the step of detecting the predetermined bit pattern includes designating the bit pattern according to the relative amplitudes of logic states within the data signal.

20. The scheme of claim 12 wherein the step of detecting the predetermined bit pattern includes designating the bit pattern according to the ratio of the difference in amplitude between a first logic state of the data signal and a second logic state of the data signal and the sum of the amplitude variances about the first logic state and the second logic state.

* * * * *